United States Patent Office 3,535,294
Patented Oct. 20, 1970

3,535,294
METHOD FOR ELECTROSTATICALLY COATING SYNTHETIC RESIN MOLDINGS
Hideo Marumo and Morio Ninomiya, Tokyo, and Shinro Watanabe, Ichikawa-shi, Japan, assignors to Lion Fat & Oil Co., Ltd., Tokyo, Japan, a corporation of Japan
No Drawing. Filed Dec. 5, 1967, Ser. No. 687,992
Claims priority, application Japan, Dec. 8, 1966, 41/80,077
Int. Cl. C08f 45/00
U.S. Cl. 260—80.7       7 Claims

ABSTRACT OF THE DISCLOSURE

A method for electrostatically coating synthetic resin moldings, said method being such that the article to be coated consists of a synthetic resin molding containing an amphoteric surface active agent having a specific chemical structure, and that this article is subjected to electrostatic coating by a coating process which is thereby extremely simplified.

BACKGROUND OF THE INVENTION

Field of the invention

The present invention is concerned with an improved electrostatic coating method which permits electrostatic coating to be performed easily on various synthetic resins ranging widely in type by a simplified coating process due to the fact that a metal salt consisting of an amphoteric surface active agent is mixed with a synthetic resin which is to be coated.

Description of the prior art

With the conventional methods for conducting electrostatic coating of synthetic resins, it has been impossible to obtain coated films having satisfactory adhesiveness unless the coating is performed after the resin moldings have been subjected to a so-called pre-coating treatment which includes a series of treatments such as a dewaxing treatment, a washing treatment, an air-drying treatment (at 60° C.–70° C. for 20 min.), a surface activating treatment (priming treatment) and an air-drying treatment, in that order. Also, the synthetic resins employed in such electrostatic coating methods of the prior art usually have been acrylonitrile-butadiene-styrene copolymers. Because of the reason that in the past it has been difficult to coat resins other than the above-mentioned type of copolymer, it has been the practice, in lieu of coating, to mix other types of resins with pigments by kneading, for the purpose of imparting luster to the resins.

Despite the extensive and strong demand in the past for simplification of the aforesaid complicated process, particularly the pre-coating treatment which has been necessary for the electrostatic coating of synthetic resins in the past, and despite the keen demand for the development of a method which would permit the electrostatic coating to be performed also on those resins which previously were not capable of being coated electrostatically, there has been made, as yet, no effective and satisfactory proposal.

SUMMARY OF THE INVENTION

It is, therefore, the object of the present invention to provide a method which not only permits the electrostatic coating of said acrylonitrile-butadiene-styrene copolymers, but also makes it possible to perform electrostatic coating on various other synthetic resins ranging widely in type such as acrylonitrile, styrene copolymers, polystyrene, polyethylene, polypropylene, polyvinyl chloride and polycarbonate, and which, at the same time, can radically simplify the prior art complicated pre-coating treatment.

DESCRIPTION OF THE PREFERRED EMBODIMENTS

The present invention provides a simple method having the great advantage described above by making the article to be coated of a material which is composed of a synthetic resin mixed, by kneading, with a metal salt consisting of an amphoteric surface active agent expressed by the general formula:

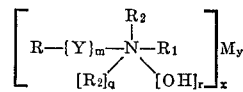

wherein:

R represents an alkyl radical having $C_8$–$C_{22}$,
M represents a metal ion selected from the group consisting of Mg, Ca, Sr, Ba, Ti, Cr, Mn, Fe, Co, Ni, Cu, Ag, Zn, Cd, Hg, Al, Sn and Pb,
$R_1$ represents —$R_3$COO—, —$R_3SO_3$—, or —$R_3OSO_3$— (where $R_3$ represents —$CH_2$—, —$C_2H_4$— or —$C_3H_6$—)
$R_2$ represents H, —$(C_2H_4O)_pH$, —$(C_3H_6O)_pH$ (where $p$ represents a number in the range of 1–50), or the aforesaid $R_1$, $q$ and $r$ are both 0 when at least one $R_2$ is H and otherwise are both 1,

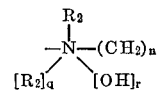

(where $n$ represents a number in the range of 2–3, and $R_2$, $q$ and $r$ are identical to the aforesaid $R_2$, $q$ and $r$,
$m$ represents a number in the range of 0–3, and
$x$, $y$ are integers in which $x$ indicates the number of $R_1$ groups in the molecule and $y$ indicates the number of metal ions necessary to combine with all of the $R_1$ groups.

In the present invention, the article to be coated is composed of a synthetic resin and a metal salt consisting of a surface active agent expressed by the foregoing general formula. The metal salt is mixed, by kneading, with said resin in an amount ranging from 0.1% to 5.0% by weight, preferably in the range of from 0.5% to 2.0% by weight, based on the weight of said resin. Since the synthetic resin, after having undergone said treatment, has a surface conductivity, it is possible to omit the surface activating treatment before performing electrostatic coating, and besides, a coating which is excellent in adhesiveness can be obtained.

As has been described, the present invention represents an improved coating method which not only makes it easy to perform electrostatic coating of resins by only subjecting said resins to a very simple treatment, but also enables one to carry out electrostatic coating on various types of resins which have been considered difficult to coat electrostatically.

The hydrocarbon radicals (R) having $C_8$–$C_{22}$ which are contained in the compounds used in the present invention and expressed by the aforesaid general formula include, for example, octyl, nonyl, decyl, undecyl, dodecyl, tridecyl, tetradecyl, pentadecyl, hexadecyl, heptadecyl, octadecyl, 2-methyl heptyl, 2-methyl octyl, 2-methylnonyl, 2-methyl decyl 2-methyl undecyl, 2-methyl dodecyl, 2-methyl tridecyl, 2-methyl tetradecyl, 2-methyl pentadecyl, 2-methyl hexadecyl, 2-methyl heptadecyl, 2-methyl octadecyl, 2-2-dimethyl hexyl, 2-2-dimethyl heptyl, 2,2-dimethyl octyl, 2,2-dimethyl nonyl, 2,2-dimethyl decyl, 2,2-dimethyl undecyl, 2,2-dimethyl dodecyl, 2,2- dimethyl tridecyl, 2,2-dimethyl tetradecyl, 2,2-dimethyl pentadecyl, 2,2-dimethyl hexadecyl, 2,2-dimethyl heptadecyl, 2,2-dimethyl octadecyl and 9-octadecenyl. The applicable metal ions include the ions of Mg, Ca, Sr, Ba, Ti, Cr, Mn, Fe, Co, Ni, Cu, Ag, Zn, Cd, Hg, Al, Sn and Pb.

Example

The following compounds:

(1) $[C_{12}H_{25}NHCH_2COO]_2Ca$ (2) $[C_{18}H_{37}NHCH_2CH_2COO]_2Zn$ (3) $[C_{14}H_{29}NHCH_2CH_2COO]_2Mg$ (4) $[C_{18}H_{37}NHCH_2CH(CH_3)COO]_2Ca$ (5) $\left[ C_{12}H_{25}N \begin{array}{l} OH \\ CH_2CH_2OH \\ CH_2CH_2OH \\ CH_2COO \end{array} \right]_2 Ca$ (6) $\left[ C_{12}H_{25}N \begin{array}{l} OH\ (CH_2CH_2O)_2H \\ (CH_2CH_2O)_2H \\ CH_2COO \end{array} \right]_2 Mg$ (7) $\left[ C_{18}H_{37}N \begin{array}{l} OH\ (CH_2CH_2O)_5H \\ (CH_2CH_2O)_5H \\ CH_2COO \end{array} \right]_2 Zn$ (8) $\left[ C_{18}H_{37}N \begin{array}{l} CH_3 \\ OH\ (CH_2CHO)_5H \\ (CH_2CHO)_5H \\ CH_2SO_3\ CH_3 \end{array} \right]_2 Ba$ (9) $\left[ C_{12}H_{25}N \begin{array}{l} OH\ CH_2CH_2OH \\ CH_2CH_2OH \\ CH_2COO \end{array} \right]_2 Mg$

(10) $\left[ C_{12}H_{25}NHCH_2CH_2CH_2N \begin{array}{l} OH\ CH_2CH_2OH \\ CH_2CH_2OH \\ CH_2COO \end{array} \right]_2 Ca$

(11) $\left[ C_{18}H_{37}-N \begin{array}{l} (CH_2CH_2O)_2H \\ OH \quad OH\ (CH_2CH_2O)_2H \\ CH_2CH_2CH_2N-(CH_2CH_2O)_2H \\ CH_2COO \quad CH_2COO \end{array} \right] Cd$

(12) $\left[ C_{14}H_{29}NCH_2CH_2NCH_2CH_2N \begin{array}{l} CH_2CH_2OH\ CH_2CH_2OH\ OH\ CH_2CH_2OH \\ CH_2CH_2OH \\ CH_2COO \end{array} \right]_2 Zn$ were prepared. Sheet-form moldings were then prepared by mixing, by kneading, one of these compounds with an acrylonitrile-butadiene-styrene copolymer, polystyrene or polyethylene in an amount ranging from 0.5% to 2.0% by weight of the weight of the resin. For comparison of coatability and adhesiveness of the coatings obtained, control sheet-form moldings (blank test pieces) not containing said compounds were also prepared. The respective sheets were divided into groups consisting of those given dewaxing, washing, drying (at 60° C. for 20 min.) and surface activating treatments; those given dewaxing, washing and drying (at 60° C. for 20 min.) treatments; and those given no pre-coating treatment. Electrostatic coating was conducted on all sheets of these three groups.

The coating apparatus used had an output of 200 cc./min., a diameter of 15 in., a revolution speed of 1500 r.p.m., and a voltage capacity of 90 kv. A coating consisting of commercial alkyd resin was applied onto these sheets by the use of said apparatus.

The results of comparisons of the coatability and the adhesiveness of the coatings between these three groups of sheets is shown in the following table. The comparison of adhesiveness was conducted by first forming, on the coated face of each sheet, a 100 mesh-form checkered pattern consisting of lines spaced at 1 mm. intervals, then placing tape-form adhesive cellulose films thereon, and thereafter stripping the films off the sheet and comparing the numbers of meshes remaining on the sheets. Comparison of coatability was performed by observing the degrees of deposition of the coating material on the sheets, wherein poorly deposited coatings are indicated by the mark X, fairly good by Δ, and good by O.

TABLE

| Resin | Compound Number | Amount added (percent) | Coated without pre-coating treatment | | Coated after dewaxing, washing and drying treatments | | Coated after dewaxing, washing, drying and surface activating treatments | |
|---|---|---|---|---|---|---|---|---|
| | | | Coatability | Adhesiveness | Coatability | Adhesiveness | Coatability | Adhesiveness |
| Acrylonitrile acrylbutadienestyrene copolymer. | Blank-test | | X | | Δ | 35 | O | 70 |
| | (1) | 0.5 | O | 70 | O | 82 | O | 91 |
| | | 1.0 | O | 82 | O | 96 | O | 99 |
| | | 2.0 | O | 99 | O | 100 | O | 100 |
| | (3) | 0.5 | O | 80 | O | 92 | O | 88 |
| | | 1.0 | O | 88 | O | 99 | O | 92 |
| | | 2.0 | O | 100 | O | 100 | O | 99 |
| | (5) | 0.5 | O | 92 | O | 85 | O | 96 |
| | | 1.0 | O | 100 | O | 91 | O | 97 |
| | | 2.0 | O | 100 | O | 97 | O | 100 |
| | (6) | 0.5 | O | 81 | O | 90 | O | 90 |
| | | 1.0 | O | 89 | O | 90 | O | 93 |
| | | 2.0 | O | 96 | O | 94 | O | 98 |
| | (7) | 0.5 | O | 100 | O | 89 | O | 91 |
| | | 1.0 | O | 100 | O | 93 | O | 95 |
| | | 2.0 | O | 100 | O | 100 | O | 99 |
| | (9) | 0.5 | O | 100 | O | 83 | O | 90 |
| | | 1.0 | O | 100 | O | 88 | O | 92 |
| | | 2.0 | O | 100 | O | 97 | O | 98 |
| | (10) | 0.5 | O | 92 | O | 92 | O | 90 |
| | | 1.0 | O | 100 | O | 98 | O | 97 |
| | | 2.0 | O | 100 | O | 100 | O | 100 |
| | (11) | 0.5 | O | 96 | O | 94 | O | 90 |
| | | 1.0 | O | 98 | O | 100 | O | 94 |
| | | 2.0 | O | 100 | O | 100 | O | 100 |
| | (12) | 0.5 | O | 92 | O | 95 | O | 94 |
| | | 1.0 | O | 100 | O | 100 | O | 100 |
| | | 2.0 | O | 100 | O | 100 | O | 100 |
| Polystyrene | Blank test | | X | | Δ | 47 | O | 76 |
| | (1) | 0.5 | O | 78 | O | 88 | O | 93 |
| | | 1.0 | O | 91 | O | 96 | O | 93 |
| | | 2.0 | O | 95 | O | 100 | O | 98 |
| | (2) | 0.5 | O | 90 | O | 90 | O | 91 |
| | | 1.0 | O | 92 | O | 100 | O | 92 |
| | | 2.0 | O | 100 | O | 100 | O | 98 |
| | (4) | 0.5 | O | 94 | O | 93 | O | 96 |
| | | 1.0 | O | 100 | O | 97 | O | 100 |
| | | 2.0 | O | 100 | O | 99 | O | 100 |

TABLE—Continued

| Resin | Compound Number | Amount added (percent) | Coated without pre-coating treatment | | Coated after dewaxing, washing and drying treatments | | Coated after dewaxing, washing, drying and surface activating treatments | |
|---|---|---|---|---|---|---|---|---|
| | | | Coatability | Adhesiveness | Coatability | Adhesiveness | Coatability | Adhesiveness |
| | (5) | 0.5 | O | 95 | O | 88 | O | 100 |
| | | 1.0 | O | 100 | O | 96 | O | 100 |
| | | 2.0 | O | 100 | O | 97 | O | 100 |
| | (6) | 0.5 | O | 87 | O | 91 | O | 92 |
| | | 1.0 | O | 95 | O | 95 | O | 97 |
| | | 2.0 | O | 100 | O | 100 | O | 100 |
| | (9) | 0.5 | O | 96 | O | 94 | O | 93 |
| | | 1.0 | O | 100 | O | 100 | O | 97 |
| | | 2.0 | O | 100 | O | 100 | O | 100 |
| | (10) | 0.5 | O | 94 | O | 93 | O | 92 |
| | | 1.0 | O | 100 | O | 97 | O | 96 |
| | | 2.0 | O | 100 | O | 100 | O | 100 |
| | (11) | 0.5 | O | 90 | O | 93 | O | 93 |
| | | 1.0 | O | 96 | O | 100 | O | 97 |
| | | 2.0 | O | 100 | O | 100 | O | 100 |
| | (12) | 0.5 | O | 91 | O | 92 | O | 97 |
| | | 1.0 | O | 97 | O | 98 | O | 100 |
| | | 2.0 | O | 100 | O | 100 | O | 100 |
| Polyethylene | Blank test | | X | | △ | 32 | O | 68 |
| | (1) | 0.5 | O | 83 | O | 91 | O | 99 |
| | | 0.7 | O | 89 | O | 91 | O | 100 |
| | | 1.0 | O | 95 | O | 100 | O | 100 |
| | (2) | 0.5 | O | 100 | O | 98 | O | 96 |
| | | 0.7 | O | 100 | O | 100 | O | 99 |
| | | 1.0 | O | 100 | O | 100 | O | 100 |
| | (7) | 0.5 | O | 92 | O | 83 | O | 90 |
| | | 0.7 | O | 96 | O | 92 | O | 92 |
| | | 1.0 | O | 100 | O | 97 | O | 98 |
| | (8) | 0.5 | O | 94 | O | 91 | O | 100 |
| | | 0.7 | O | 96 | O | 100 | O | 100 |
| | | 1.0 | O | 99 | O | 100 | O | 100 |

As shown in the above table, by the use of the method of the present invention, it is made possible to perform a coating comparable to a coating obtained by prior art practices which include the pre-coating treatment, even though a pre-coating treatment which has been indispensable with the conventional electrostatic coating methods is omitted.

What is claimed is:

1. A method which comprises electrostatically applying a coating material to a molded article made of an electrostatically coatable synthetic resin selected from the group consisting of acrylonitrile-butadiene-styrene copolymers, acrylonitrile-styrene copolymers, polystyrene, polyethylene, polypropylene, polyvinyl chloride and polycarbonate, siad resin containing admixed therein from about 0.1 to about 5% by weight of the resin, of an amphoteric surface active agent of the formula:

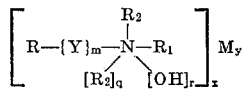

wherein:

R is an alkyl radical having 8–22 carbon atoms,
M is a metal ion selected from the group consisting of Mg, Ca, Sr, Ba, Ti, Cr, Mn, Fe, Co, Ni, Cu, Ag, Zn, Cd, Hg, Al, Sn and Pb,
$R_1$ is selected from the group consisting of —$R_3$COO—, —$R_3$SO$_3$— and —$R_3$OSO$_3$— (in which $R_3$ is selected from the group consisting of —CH$_2$—, —C$_2$H$_4$— and —C$_3$H$_6$—),
$R_2$ is selected from the group consisting of H, —(C$_2$H$_4$O)$_p$H —(C$_3$H$_6$O)$_p$H (in which $p$ is a number in the range of 1 to 50) and the aforesaid $R_1$,
$q$, $r$ are both 0 when at least one $R_2$ is H and otherwise are both 1

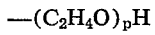

in which $n$ is a number in the range of 2 to 3 and $R_2$, $q$ and $r$ are the same as the aforesaid $R_2$, $q$ and $r$,
$m$ represents a number in the range of 0 to 3,
$x$, $y$ are intergers in which $x$ indicates the number of $R_1$ groups in the molecule and $y$ indicates the number of metal ions necessary to combine with all of the $R_1$ groups.

2. A method according to claim 1, wherein said electrostatic coating is performed on said article to be coated containing said amphoteric surface active agent, without giving said article a pre-coating treatment.

3. A method according to claim 1, wherein said amphoteric surface active agent is a compound containing a hydrocarbon radical having $C_{12}$–$C_{18}$.

4. A method according to claim 1, wherein said article to be coated in an acrylonitrile-butadiene-styrene copolymer.

5. A method according to claim 1, wherein said article to be coated is polystyrene.

6. A method according to claim 1, wherein said article to be coated is polyethylene.

7. A composition comprising a molded article made of an electrostatically coatable synthetic resin selected from the group consisting essentialy of acrylonitrile-butadiene-styrene copolymers, acrylonitrile-styrene copolymers, polystyrene, polyethylene, polypropylene, polyvinyl chloride and polycarbonate, said resin containing admixed therein from about 0.1 to about 5% by weight of the resin, of an amphoteric surface active agent of the formula:

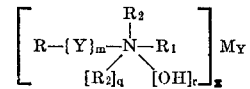

wherein:

R is an alkyl radical having 8–22 carbon atoms,
M is a metal ion selected from the group consisting of Mg, Ca, Sr, Ba, Ti, Cr, Mn, Fe, Co, Ni, Cu, Ag, Zn, Cd, Hg, Al, Sn and Pb,
$R_1$ is selected from the group consisting of —$R_3$COO—, —$R_3$SO$_3$— and —$R_3$OSO$_3$— (in which $R_3$ is selected from the group consisting of —CH$_2$—, —CH$_2$H$_4$— and —CH$_3$H$_6$—),
$R_2$ is selected from the group consisting of H, —(C$_2$H$_4$O)$_p$H —(C$_3$H$_6$O)$_p$H (in which $p$ is a number in the range of 1 to 50) and the aforesaid $R_1$, $q$, $r$ are both 0 when at least one $R_2$ is H and otherwise are both 1

Y is 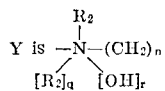

(in which $n$ is a number in the range of 2 to 3 and $R_2$, $q$ and $r$ are the same as the aforesaid $R_2$, $q$ and $r$,
$m$ represents a number in the range of 0 to 3,
$x$, $y$ are integers in which $x$ indicates the number of $R_1$ groups in the molecule and $y$ indicates the number of metal ions necessary to combine with all of the $R_1$ groups.

References Cited

UNITED STATES PATENTS

| 2,588,398 | 3/1952 | Mast et al. |
| 3,324,091 | 6/1967 | Savides. |
| 3,399,178 | 8/1968 | Savides et al. |
| 3,407,187 | 10/1968 | Savides et al. |
| 3,445,440 | 5/1969 | Susi et al. |

HARRY WONG, JR., Primary Examiner

U.S. Cl. X.R.

117—138.8; 260—77.5, 85.5, 92.8, 93.5, 93.7, 94.9